June 17, 1958 P. REKETTYE 2,838,798
PROCESS AND APPARATUS FOR MAKING INFLATED HOLLOW
ARTICLES BY ROTATIONAL CASTING
Filed May 10, 1954
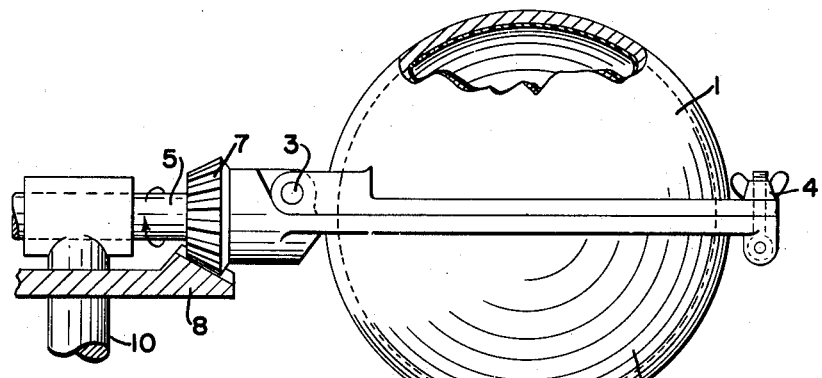
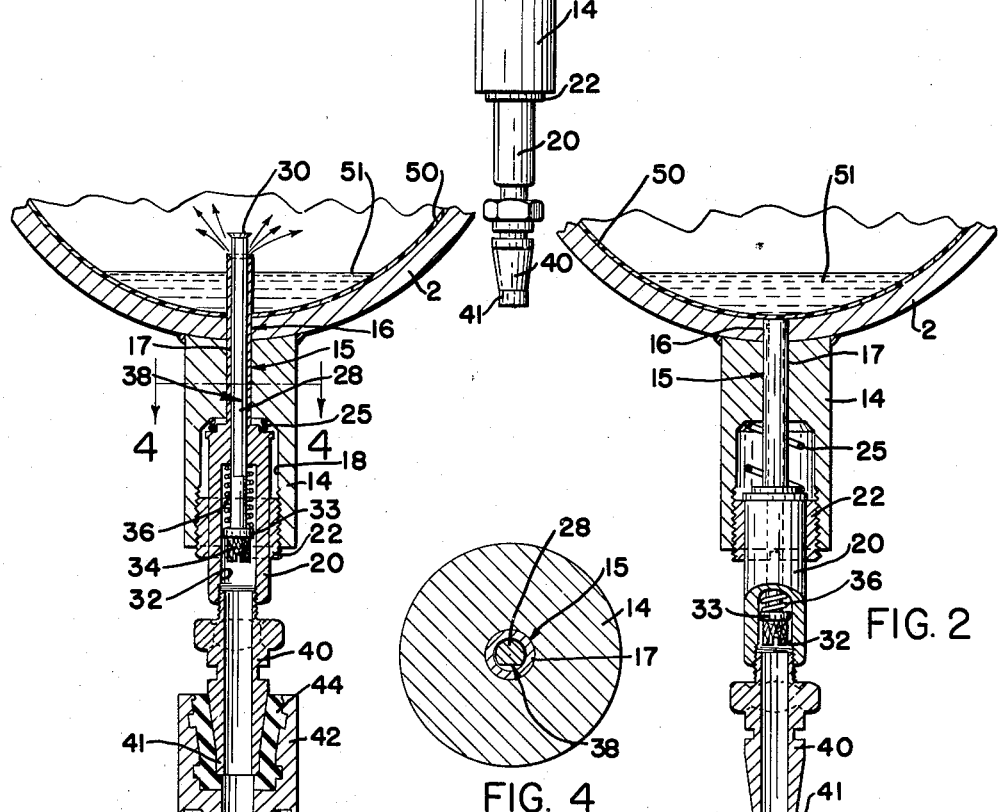
INVENTOR.
PAUL REKETTYE
BY Ely, Frye y Hamilton
ATTORNEYS United States Patent Office 2,838,798
Patented June 17, 1958

2,838,798

PROCESS AND APPARATUS FOR MAKING IN-
FLATED HOLLOW ARTICLES BY ROTA-
TIONAL CASTING

Paul Rekettye, Akron, Ohio, assignor to The Sun Rubber
Company, Barberton, Ohio, a corporation of Ohio Application May 10, 1954, Serial No. 428,774

5 Claims. (Cl. 18—39)

The present invention relates to the manufacture of hollow inflated articles by the rotational casting method such as shown and described in the United States Patent to Molitor No. 2,629,134, issued February 24, 1953.

Since the advent of the Molitor process the basic steps in the manufacture of hollow articles from plastomeric materials such as polyvinyl resins, copolymers of vinyl chloride, polyethylene and similar materials are well known to the trade. The resins are combined with plasticizers so that they will flow easily and with other compounding materials as is well known. A measured charge of the compounded resin is placed in a closed sectional mold and the mold is rotated or oscillated upon divergent axes so as to distribute the charge over the inner surface of the mold. During the rotation or oscillation the mold is heated so that the resin absorbs the plasticizers, the first phase of the action being a gelling action which begins at about 200° F. to 250° F. On further application of heat to bring the temperature of the plastisol to between 300° F. to 400° F., the material begins to fuse as a soft gummy mass with little strength. After the plastisol has fused or set, the mold is chilled sufficiently for the mass to acquire strength which increases as the cooling progresses.

Heretofore, hollow articles made by the process of rotational casting have been inflated after they are completed and removed from the mold in which they were cast. The usual method is to insert an inflating needle through the wall of the article and after the requisite pressure has been reached to withdraw the needle and quickly seal up the point where the needle entered by locally re-fusing the plastisol.

This is not only a time consuming operation, but is often unsatisfactory because the sealing operations are not always perfect and slow leaks may occur which are not discovered until after the articles have been shipped.

The object of the present invention is to devise a method and apparatus whereby the article will be inflated while in the process of manufacture and during the rotational casting operation. This makes a perfect air tight seal, and it is almost impossible to detect the point at which the article was inflated. It also saves the time and labor required to inflate the article by former methods.

The inflating medium usually employed is air although any gas or even a liquid under pressure may be used. While a ball is shown, the process may be applied to any other hollow articles which it is necessary to inflate.

Briefly stated the process consists in loading a mold with a measured charge of the plastisol sufficient to form the wall of the article to the required thickness. The mold is provided with an inflating valve, which, when withdrawn is flush with the inner wall of the mold so that the object will be perfectly formed. The end of the valve is closed except during the inflating operation. The mold is then rotated or oscillated upon two divergent axes to distribute the plastisol over the inner surface of the mold. During this period, the mold is heated so as to cause the plastisol to gel against the mold. After a thin layer of the plastisol has partially gelled on the interior of the mold and while there is still a substantial amount of the plastisol in liquid condition, the rotation of the mold is stopped and the inflating valve or needle is projected through the thin wall which was formed. It is preferable to stop the mold with the pool of liquid plastisol over the end of the valve which at this time is flush with the inner surface of the mold. This is because the thin wall formed on the inner surface of the mold will be ruptured and the gas under pressure would find its way between the thin film of gelled plastisol and the surface of the mold, if the point of entry of the valve were not covered by the plastisol.

The valve is projected through the pool of plastisol and into the interior of the mold, and is connected to a source of gas under pressure. The pressure of the incoming gas opens the valve and the gas flows into the interior of the mold where it is surrounded by the relatively thin gelled layer, so that the gas is retained therein. The pressure which is attained by the gas in the interior of the article is determined by the ultimate pressure desired, proper adjustments being made to compensate for the temperature of the mold.

When the requisite pressure is reached, the pressure line is shut off and the valve withdrawn. The rotation or oscillation of the mold is resumed under the condition of the Molitor process to the completion of the gelling, and through the fusing and cooling periods. Thereafter the mold is opened and the finished inflated article is removed.

This application also includes a mechanism for carrying out the process which is shown in the best known and preferred forms, but it is possible to vary and modify the apparatus without departing from the invention. While a ball mold is shown, any type of mold may be employed.

It is also possible to modify the steps of the process by changing the basic principles thereof.

In the drawings:

Fig. 1 is a side view of a unit for rotationally casting a hollow object, such as a ball.

Fig. 2 is a cross section through the lower part of the mold at or about the time that its rotation should be arrested for the inflation of the article.

Fig. 3 is a similar cross section at the time of inflation.

Fig. 4 is a section on the line 4—4 of Fig. 3.

A mold is shown having a section 1 which is shown as hinged to a second section 2 as at 3. A clamp 4 holds the mold together. The mold is opened to receive the charge of liquid plastisol and then closed and locked.

The rotation or oscillation of the mold is obtained by securing the mold on a shaft 5 which constitutes one axis of rotation, being driven by a pinion 7 meshing with a second pinion 8 carried on the end of a shaft 10, which constitutes the second and divergent axis of rotation. The shaft 5 is carried on the end of the shaft 10 and during the casting operation, the shafts will be rotated or oscillated, so as to distribute the plastisol over the inner surface of the mold. The mold is heated during the first stages of the process so as to gel the plastisol and then to fuse it as is understood in this art.

Welded to one section of the mold, here shown as the section 2, is a valve housing 14 having a central passage 15 which registers with an aperture 16 preferably located at the lowest point on the section 2 when the mold is at rest with the section 2 on the underside of the mold. Slidably mounted in the housing 14 is the tubular valve stem 17, the inner end of which projects into the aperture 16 and is flush with the inner surface of the mold section 2 when the valve is withdrawn. At this point, the stem is formed with a conical seat. The housing 14 is cored out at 18 and at this point the valve stem is enlarged to form the cylindrical extension 20 that is slidably received in a collar 22, threaded into the outer end of the housing 14. Between the inner end of the extension 20 and the base of the recess 18 is the coil spring 25 which normally holds the valve stem in its retracted position as shown in Fig. 2, but allows it to be projected into the mold cavity as shown in Fig. 3.

The valve proper has a long actuating pin 28 which is slidably mounted in the valve stem 17, the upper end of the valve pin having a conical head 30 which, when the valve is retracted, rests in the seat at the end of the valve stem and seals it. The inner end of the valve is extended into an enlarged chamber 32 where it carries a loose fitting piston 33 held in place by a nut 34. A light coil spring 36 lying between the piston 33 and the base of the chamber 32 normally keeps the valve seated so that the passage through the valve stem is closed. A side of the valve pin 28 is cut away, as at 38, to permit the flow of gas through the valve and into the interior of the mold.

In the outer end of the extension 20 is threaded a tubular coupling 40 having a tapered end 41 to which a companion coupling 42 may be fitted. The end of the coupling 42 is provided with a yielding gasket 44 which will make fluid tight connection with the coupling 40 to receive the gas under pressure from the line 45.

The operation will be clear from the foregoing. Shortly after the mold is set in rotation, or oscillation, so that a skin or film of the plastisol has gelled about the entire inner surface of the mold, as shown at 50, and while there is still a pool of the liquid plastisol, as shown at 51, the movement of the mold is temporarily arrested with the valve at or near the lowermost point on the mold. The operator now brings the connection 42 into engagement with the coupling 40 and presses upwardly thereon, raising the valve through the pool of plastisol to the position shown in Fig. 3, which raises the valve proper above the level of the liquid plastisol. He then opens a valve in the line 45 and the blast of air or gas under pressure unseats the valve, as shown in Fig. 3, permitting the air or gas to flow into the interior of the mold where it will be confined by the thin wall 50.

When the pressure reaches the desired point, the line 45 is disconnected and the valve stem 17 and the valve pin 28 are returned to their original position as shown in Fig. 2, where the valve now forms a part of the inner wall of the mold. The rotation or oscillation of the mold is resumed and carried on through the balance of the process. This produces a ready-inflated article which can be removed after the mold has been cooled to finally set the plastisol.

It will be appreciated that details of mechanisms to rotate or oscillate the mold are not important, as either full rotation on both axes or oscillation on one or both axes is sufficient, it being desirable to have a complete skin or film of the plastisol gelled about the mold surface before inflating the object. Wherever the broad term "rotating" is used in the claims, it will be understood to cover either complete rotation or oscillation on one or both axes.

What is claimed is:

1. In a process for making an inflated hollow article from a rotationally cast plastisol, the steps of: filling a mold with a liquid charge of plastisol having a volume less than the volume of the mold; closing the mold; rotating the mold to distribute the plastisol over the interior thereof; concurrently with said rotation, applying sufficient heat to said mold so that a portion of the distributed plastisol will form a gelled layer; after formation of said gelled layer, slowing said rotation to form a substantially stationary pool of ungelled plastisol; introducing a charge of inflating medium through said gelled layer and said pool of ungelled plastisol into the interior of said mold; and continuing rotation of the mold concurrently with the application of additional heat thereto so that all of said plastisol is distributed over the interior thereof and fused.

2. In a process for making an inflated hollow article from a rotationally cast plastisol, the steps of: filling a mold with a liquid charge of plastisol having a volume less than the volume of the mold; closing the mold; rotating the mold about a variable axis to distribute the plastisol over the interior thereof; concurrently with said rotation, applying sufficient heat to said mold so that a portion of the distributed plastisol will form a gelled layer; stopping the rotation of the mold; inserting an inflation tube into the interior of the mold through the gelled plastisol layer; introducing a charge of inflating medium within the gelled plastisol layer; withdrawing said inflation tube exteriorly of said gelled layer and continuing rotation of the mold concurrently with the application of additional heat thereto so that all of said plastisol is distributed over the interior thereof and fused.

3. In a process for making an inflated hollow article from a rotationally cast plastisol, the steps of: filling a mold with a liquid charge of plastisol having a volume less than the volume of the mold; closing the mold; rotating the mold on divergent axes to distribute the plastisol over the interior thereof; concurrently with said rotation, applying sufficient heat to said mold so that a portion of the distributed plastisol will form a gelled layer; stopping the rotation of the mold so that a pool of ungelled plastisol is formed; inserting an inflation tube into the interior of the mold through the gelled layer and ungelled pool of plastisol; introducing a charge of inflating medium within the gelled plastisol layer; withdrawing said inflation tube exteriorly of said gelled layer and continuing rotation of the mold concurrently with the application of additional heat thereto so that all of said plastisol is distributed over the interior thereof and fused.

4. In a sectional mold for rotationally casting a hollow plastisol article, said mold having an opening through a wall thereof for introducing a charge of inflating medium into the mold interior, the combination of: a housing attached to the exterior of the mold around the opening; an annular member at the outer end of said housing; a tube slidably mounted in the housing; spring means within said housing normally biasing said tube against said annular member with the inner end of said tube substantially flush with said mold wall; a valve slidably mounted in said tube; spring means within said tube normally biasing said valve substantially flush with said mold wall to close said tube; and piston means on the outer end of said valve to open the inner end of said tube when a charge of inflating medium under pressure is introduced into the outer end of said tube.

5. In a sectional mold for rotationally casting a hollow plastisol article, said mold having an opening through a wall thereof for introducing a charge of inflating medium into the mold interior, the combination of: a housing attached to the exterior of the mold around the opening and having a central passage registering with said opening, an enlarged diameter bore communicating with the outer end of said passage, and a reduced diameter annular member at the outer end of said bore; a slidable tube having a stem within said passage and an enlarged portion within said bore; spring means normally biasing the enlarged portion of said tube against said annular member with the stem of said tube substantially flush with said mold wall; a valve at the inner end of said stem having an actuating pin slidable in said stem; spring means within the enlarged portion of said tube normally biasing said valve substantially flush with said mold wall to close the stem of said tube; and piston means on said actuating pin to open said tube stem when a charge of inflating medium under pressure is introduced into the enlarged portion of said tube.

(References on following page)

References Cited in the file of this patent

UNITED STATES PATENTS

| | | |
|---|---|---|
| 1,998,897 | Kay | Apr. 23, 1935 |
| 2,035,774 | Trobridge | Mar. 31, 1936 |
| 2,060,962 | Twiss et al. | Nov. 17, 1936 |
| 2,324,974 | Greenup | July 20, 1943 |
| 2,569,869 | Rempel | Oct. 2, 1951 |
| 2,659,107 | De Bell | Nov. 17, 1953 |
| 2,666,952 | Lawson | Jan. 26, 1954 |

FOREIGN PATENTS

| | | |
|---|---|---|
| 436,424 | Great Britain | Oct. 10, 1935 |